Dec. 14, 1937.  J. AUGER  2,102,503
FAUCET
Filed Nov. 17, 1934  3 Sheets-Sheet 1

Inventor
Joe Auger
BY Eugene Stevens Atty.

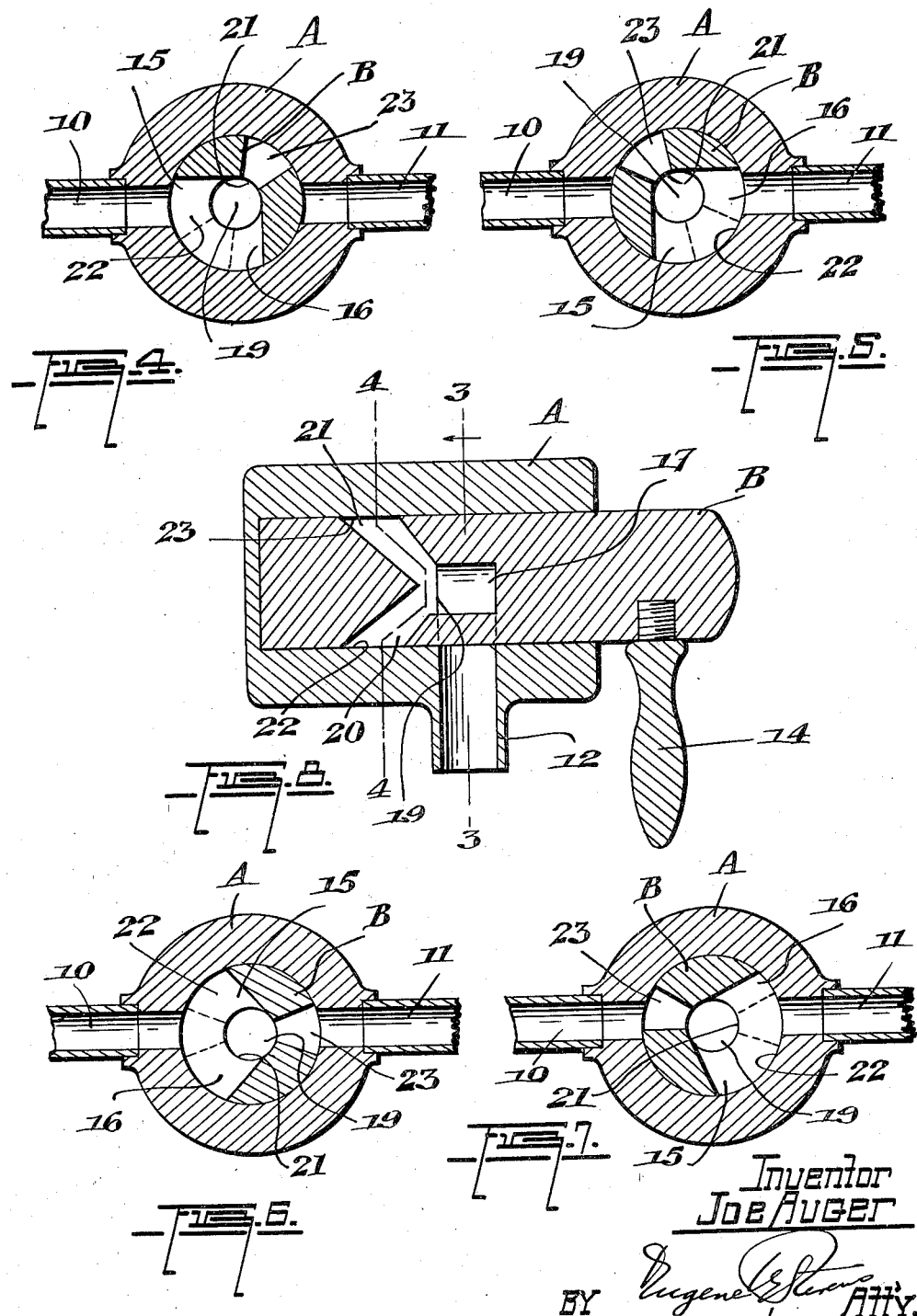

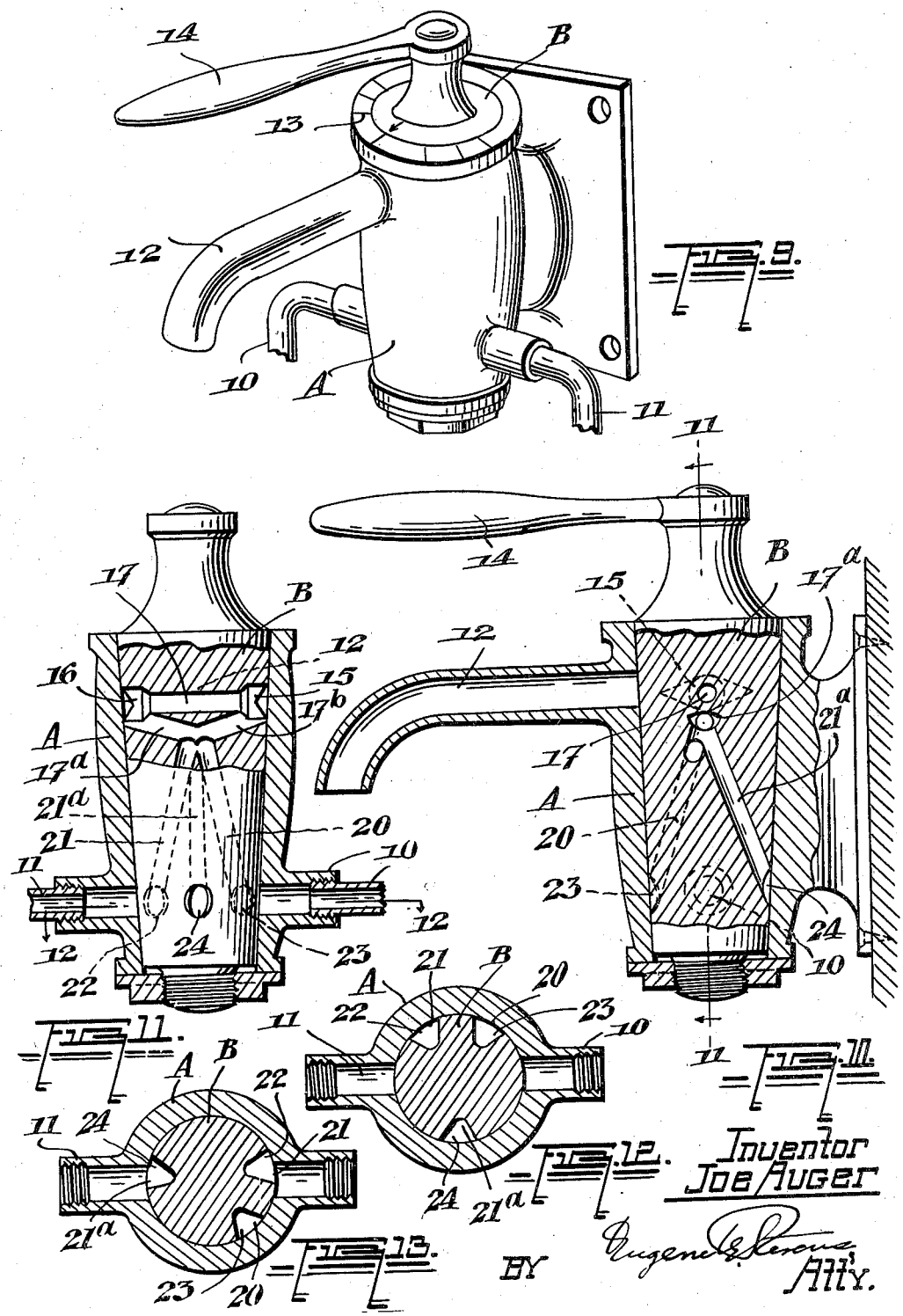

Patented Dec. 14, 1937

2,102,503

UNITED STATES PATENT OFFICE 2,102,503

FAUCET

Joe Auger, Elk Lake, Ontario, Canada

Application November 17, 1934, Serial No. 753,518
In Canada December 21, 1933

7 Claims. (Cl. 251—104)

This invention relates to faucets and an object of the invention is to provide an improved faucet for delivering hot and cold liquid through a common discharge.

A further object of the invention is to provide a faucet of the character whereby hot and cold fluids may be commonly discharged, the temperature thereof being regulated to a fairly minute degree.

A further object of the invention is to provide a device of this character of very simple construction which may be manufactured very economically.

With these and other objects in view, the invention consists essentially of housing adapted to carry a rotary valve plug and having hot and cold liquid inlets and a common discharge positioned in different planes, the valve plug being provided with passageways adapted to register fully or to various degrees with the inlets and to communicate with the discharge in the majority of the several positions to which the plug may be rotated, as more fully described in the following specification and illustrated in the accompanying drawings which form part of the same.

In the drawings:—

Figure 4 is a transverse section on line 4—4 of Figure 8 of same at a point registering with the inlet conduits showing the passageways in the valve registering with the hot water conduit.

Figure 5 is a similar view to Figure 4, showing the valve in reverse position registering with the cold liquid conduit.

Figure 6 is a similar view showing the passageways equally registering with the hot and cold inlets.

Figure 7 is another similar view showing one passageway in the valve partly registering with one liquid inlet and the other registering fully with the opposite inlet.

Figure 8 is a longitudinal section taken through the valve at right angles to the section shown in Figure 2.

Figure 9 is a perspective view of the second embodiment of my invention in its broad aspect.

Figure 10 is a sectional view of Figure 9 taken on the axial plane of the faucet perpendicular to the wall plate.

Figure 11 is a longitudinal section on the line 11—11 of Figure 10.

Figure 12 is a transverse section on the line 12—12 of Figure 11 showing the hot and cold liquid conduits sealed against discharge.

Figure 13 is a similar transverse section to Figure 12 showing the passageways partially registering with hot and cold liquid conduits.

Figure 1:
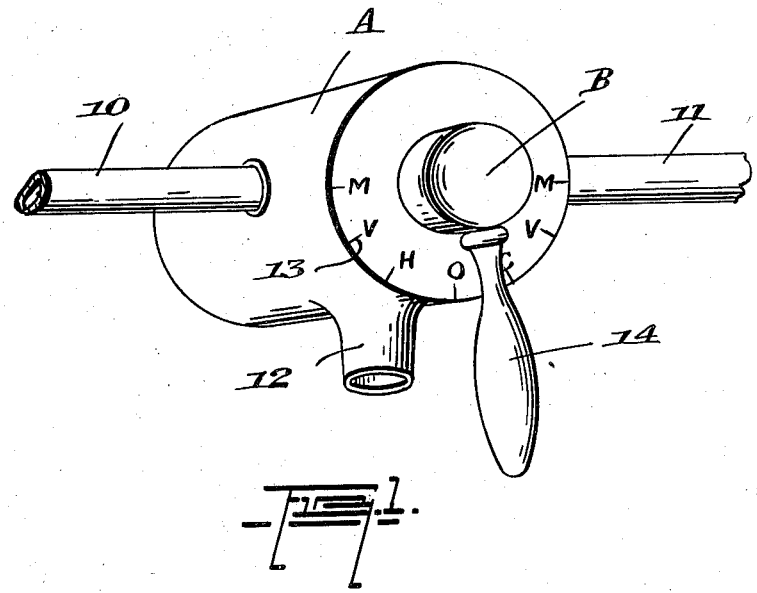
Figure 1 is a perspective view showing one embodiment of my faucet.

Referring more particularly to the drawings, A indicates the faucet housing adapted rotatably to carry the valve plug B. Communicating with the housing on each side thereof is a hot water conduit 10 and cold water conduit 11 which is adapted to supply the liquid to the housing which is discharged from either one of these conduits or both, and through the discharge spout 12, according to the operation of the valve plug B.

The outer face of the housing A may be graduated as at 13 to indicate set positions of the valve plug for obtaining hot and cold water, substantially equally mixed hot and cold water, or unequally mixed hot and cold water and, when the valve plug B is operated by means of the handle 14 to any one of these positions, the passageways in the valve will appropriately register with the hot and cold water conduits 10 and 11 to discharge hot or cold water or the desired mixture through the spout 12. To this end the plug B is provided with opposed liquid discharge ducts 15 and 16 which extend over substantially a quarter of the circumference of the valve plug, and communicate with a common passageway 17 (see Figures 2 and 3). The ducts 15 and 16 are designed, during rotation of the valve plug B, to register with the discharge spout 12 and it will be apparent, upon referring to Figure 3, that the valve plug may be moved to various degrees and yet the ducts 15 and 16 will fully register with the discharge spout, owing to the fact that they open on the outer surface of the plug over an extended area of its circumference.

Figures 2, 3:
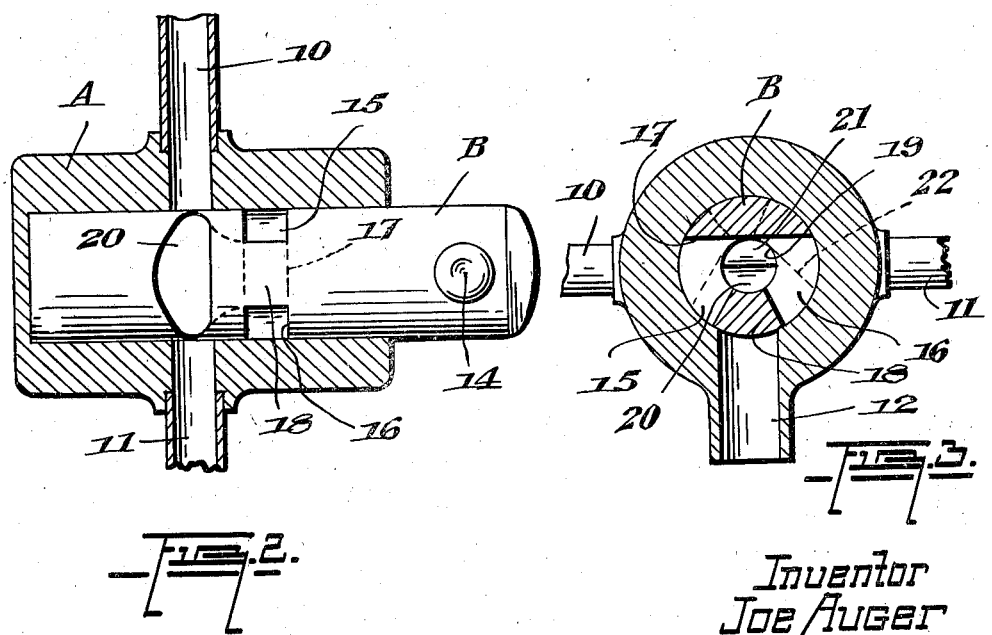
Figure 2 is a longitudinal section taken through same at a point corresponding with the liquid inlet conduits.
Figure 3 is a transverse section on line 3—3 of Figure 8 of same at a point registering with the discharge spout.

Between the ducts 15 and 16 and defining one side of the passageway 17 is the wall 18, this wall being positioned in the plug in a line with the operating handle 14 so that, when the handle 14 is in a position parallel and in alignment with the spout 12, the wall 18 will register with the discharge spout, as shown in Figure 3, and consequently the water supply will be shut off. Communicating with the passageway 17 a vertical passageway 19 may be provided which in turn communicates with a pair of opposed and inclined inlet passageways 20 and 21. On the other hand these latter passages may communicate directly with passageway 17. The passageway 20 opens on the surface of the valve plug in an enlarged intake duct 22 which extends over nearly one-half the circumference of the valve plug.

The passageway 21 has a slightly enlarged intake duct 23 which is much smaller than the duct 22, but it will be apparent that when either of the intake ducts 22 or 23 register with either of the inlet conduits 10 and 11 the liquid will flow from the respective conduit through the passageways 20 and 21, as the case may be, through the vertical passageway 19 and discharge through one of the ducts 15 or 16 by way of the passageway 17. Consequently, if the operating handle 14 is moved to the position indicated in Figure 1 by the letter H for hot water, a portion of the enlarged duct 22 will register with the conduit 10 and the hot water will therefore pass through passageway 20 into vertical passageway 19, through the transverse passageway 17, and discharge through the duct 16, which is then in registry with the discharge spout 12. In this position, as illustrated in Figure 4, the duct 23 and, consequently, the passageway 21 is closed since it opens against the wall of the housing A.

Figure 5 illustrates the reverse position for cold water when the operating handle 14 has been moved in the opposite direction to lie above the point marked C in Figure 1. If it is desired to obtain a mixture of hot and cold water with the hot water predominating the operating handle 14 may be moved to the left, as viewed from Figure 1, to a position registering with the point marked M. In this position, which is illustrated in Figure 6, the duct 22 is in registry with the hot water conduit 10 and the duct 23 is in registry with the cold water conduit 11 so that a full volume of hot water according to the capacity of the conduit 10 will be introduced to the vertical passageway 19 while a slightly less volume of cold water will be introduced to this passageway from the duct 23 by reason of the restricted passageway 21.

This mixture will then flow from vertical passageway 19 to the transverse passageway 17 and discharge through duct 16 through the discharge spout. It is only necessary, therefore, to rotate the valve plug B to an extreme position with the operating handle 14 lying above the point marked M on the right hand side of Figure 1 when a mixture of hot and cold water with cold predominating will be obtained, the mixture discharging through the duct 15 and spout 12. By moving the handle back to a position intermediate of the point C and point M, only a portion of the duct 23 will register with the conduit 10 (see Figure 7) while, by reason of the enlarged duct 22, a full volume of water may be introduced from the cold water conduit 11 to the passageway 19 so that a mixture with cold water more predominant will be obtained. Conversely, when the operating handle is moved to a position intermediate the points M and H, a mixture will be obtained with hot water even more predominant because only a part of the duct 23 will register with the conduit 11.

Referring to the second embodiment of my invention shown in Figures 9 to 13, A indicates the faucet housing adapted rotatably to carry the valve plug B. Communicating with the housing on each side thereof is a hot water conduit 10 and cold water conduit 11 which is adapted to supply the liquid to the housing which is discharged from either one of these conduits or both and through the discharge spout 12, according to the operation of the valve plug B.

The outer facing of the housing A may be graduated as at 13 to indicate set positions of the valve plug for obtaining hot and cold water, substantially equally mixed hot and cold water or unequally mixed hot and cold water, so that when the valve plug B is operated by means of the handle 14 to any one of these positions the passageways in the valve will appropriately register with the hot and cold conduits 10 and 11 to discharge hot or cold water or the desired mixture through the spout 12. To this end the plug B is provided with a discharge passageway disposed diametrically through the plug on the plane of the discharge spout having its longitudinal axis at right angles to the longitudinal axis of the handle 14. This diametrically disposed passageway 17 terminates on either side of the plug in enlarged orifices 15 and 16. Communicating with the extremities of passageway 17 are two opposed passageways 17a and 17b inclined slightly upwardly and outwardly from the vertical axis of the plug. In opposed positions on the periphery of the plug along the plane of the hot and cold conduits are three enlarged orifices 22, 23, and 24 and from these orifices, passageways 20, 21, and 21a are inclined inwardly and upwardly to meet the junction of the slightly inclined passageways 17a and 17b. The adjacent sides of the orifices 22 and 23 are disposed at a distance apart which is slightly in excess of the interior diameter of the hot and cold conduits 10 and 11, as clearly shown in Figure 13, while orifice 24 is almost diametrically opposed to the orifices 22 and 23, as shown in Figures 12 and 13. It will also be seen from reference to the drawings of this second embodiment that the longitudinal axis of passageway 17 is at right angles to a theoretical line drawn from the centre of the orifice 24 to a point half way between the centres of the orifices 22 and 23.

From the foregoing it will be seen that if the plug B, as illustrated in Figure 12, is rotated approximately 30° in a clockwise direction the orifice 23 will commence to register with the hot water conduit 10, and its area of registration will increase until it becomes fully registered with said conduit 10. From thence, being continually rotated, it will gradually pass out of registration with the hot water conduit while the orifice 24 is increasingly registering with the cold water conduit until it is in full alignment therewith. At this point the handle 14 will be 90° in a clockwise direction with respect to the spout 12 and passageway 17 will be in alignment with the spout 12 with the orifice 16 adjacent to the spout, but it should be here observed that the passageway 17 does not necessarily have to be in exact alignment with the discharge orifice in order to secure a maximum flow of water therefrom since the external orifices 15 and 16 of the passageway 17 are enlarged, as previously stated. If the plug B is now returned to its former position and then continuously rotated in an anti-clockwise direction it will be observed that the orifice 22 gradually proceeds to come into full registration with the cold water conduit 11, from which it passes out of registration at the same time as orifice 24 approaches full registration with the hot water conduit 10. At this point the handle 14 is again at an angle of 90° but in an anti-clockwise direction with respect to the spout 12; also passageway 17 is again in line with the spout 12 but with the plug in this position orifice 15 is adjacent the spout.

It will therefore be seen that substantially the same result may be obtained by rotating the handle 14 to left or right, but that turned in the one direction cold fluid will emerge first and in the other direction hot fluid, and that upon further rotation in either direction the hot and cold fluid will be an admixture of gradually diminishing cold and increasing hot, or diminishing hot and increasing cold, with a full head of hot fluid or cold fluid according as the handle 14 is turned 90° to left or right with respect to the spout 12, as previously stated.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

I claim:—

1. A faucet comprising a casing, hot and cold liquid conduits communicating with the casing, a valve plug rotatably mounted within the casing, said plug having opposed passageways formed therein opening on the surface of the plug in enlarged intake ducts in a plane registering with the liquid conduits, said plug including opposed passageways terminating in enlarged discharge ducts opening on the surface of the plug in a plane registering with the said spout and commonly communicating with said passageways whereby said intake and discharge ducts may communicate with the conduits and discharge spout to discharge hot or cold liquid or a mixture of both first in full flow from one conduit and subsequently in increasing amounts from the other conduit without at first reducing the flow from the first conduit.

2. The device as claimed in claim 1 in which one of the intake ducts is larger than the other whereby when one duct communicates with the hot liquid conduit and the other with the cold inlet conduit a mixture of hot and cold liquid is discharged from the spout, the mixture being predominatingly warmer or cooler according to the disposition of the ducts.

3. A faucet comprising a casing, hot and cold liquid conduits communicating with the casing, a liquid discharge spout communicating with the casing, a valve plug rotatably mounted within the casing, said plug having opposed passageways inclined towards each other to communicate within the plug, said passageways opening on the surface of the plug in ducts in a plane registering with the liquid conduits, said plug including a pair of opposed communicating liquid discharge ducts opening on the surface of the plug in a plane registering with said spout and commonly communicating with said passageways whereby said intake and discharge ducts may communicate with the conduits and discharge spout to discharge hot or cold liquid or a mixture of both first in full flow from one conduit and subsequently in increasing amounts from the other conduit without at first reducing the flow from the first conduit.

4. A faucet comprising a casing, hot and cold liquid conduits communicating with the casing, a liquid discharge spout communicating with the casing, a valve plug rotatably mounted within the casing, said plug having opposed passageways formed therein opening on the surface of the plug in intake ducts in a plane registering with the liquid conduits, said plug including a pair of opposed liquid discharge ducts on the surface of the plug in a plane registering with said spout and commonly communicating with said passageways whereby said intake and discharge ducts may communicate with the conduits and discharge spout to discharge hot or cold liquid or a mixture of both, an operating handle connected to the plug and disposed outside the casing, the end of said casing being graduated in accordance with operating positions of the plug, said handle constituting with said graduations an indicator as to the position to which said plug has been moved.

5. A faucet comprising a casing, hot and cold liquid conduits communicating with the casing, a liquid discharge spout communicating with the casing, a valve plug rotatably mounted within the casing, said plug having opposed passageways inclined towards each other to communicate with a common passageway within said plug, said passageways opening on the surface of the plug in ducts in a plane registering with the liquid conduits, said plug including a pair of opposed liquid discharge ducts each communicating with said common passageway and opening on the surface of the plug in a plane registering with said spout whereby said intake and discharge ducts may communicate with the conduits and discharge spout to discharge hot or cold liquid or a mixture of both first in full flow from one conduit and subsequently in increasing amounts from the other conduit without at first reducing the flow from the first conduit.

6. A faucet comprising a casing, hot and cold liquid conduits communicating with the casing, a liquid discharge spout communicating with the casing, a valve plug rotatably mounted within the casing, said plug having a passageway formed therein opening on the surface of the plug in an intake duct in a plane registering with the liquid conduits, at least two intake passageways opposed to said first passageway also opening on the surface of the plug in intake ducts in a plane registering with the liquid conduits, said plug including a pair of opposed liquid discharge ducts in the surface of the plug in a plane registering with said spout and commonly communicating with said passageways whereby said intake and discharge ducts may communicate with the conduits and discharge spout to discharge hot or cold liquid or a mixture of both, an operating handle connected to the plug and disposed outside the casing, the end of said casing being graduated in accordance with operating positions of the plug, said handle constituting with said graduations an indicator as to the position to which said plug has been moved.

7. A faucet comprising a casing, diametrically opposed hot and cold liquid intake conduits in the same plane communicating with the casing, a discharge spout from the casing at right angles to and on a different plane from the hot and cold liquid conduits, a plug rotatably mounted within the casing having three intake ducts with openings onto the surface of the plug in the plane of the intake conduits, and an outlet passageway in the plane of the discharge spout, the openings of two intake ducts being a distance apart slightly greater than the diameter of an intake conduit, the remaining duct opening being diametrically opposed to the space between the first two ducts, said intake ducts leading to the said discharge passageway, the discharge passage and ducts being so disposed that the discharge passage is perpendicular to the diameter from the last mentioned intake duct opening.

JOE AUGER.